(12) United States Patent
Loga et al.

(10) Patent No.: US 7,870,873 B2
(45) Date of Patent: Jan. 18, 2011

(54) DUAL CHAMBER ORIFICE FITTING ISOLATION VALVE

(75) Inventors: Thomas Henry Loga, Houston, TX (US); Gary Allen Tatum, Houston, TX (US); Gregory Theron Jay, Houston, TX (US); Anthony Jones, Houston, TX (US)

(73) Assignee: Daniel Industries, Inc., Houston, TX (US)

( * ) Notice: Subject to any disclaimer, the term of this patent is extended or adjusted under 35 U.S.C. 154(b) by 1345 days.

(21) Appl. No.: 11/352,663

(22) Filed: Feb. 13, 2006

(65) Prior Publication Data

US 2007/0186987 A1 Aug. 16, 2007

(51) Int. Cl.
*F16L 55/10* (2006.01)
(52) U.S. Cl. .................... 138/94.5; 138/94; 138/94.3
(58) Field of Classification Search ............ 138/94, 138/94.3, 94.5
See application file for complete search history.

(56) References Cited

U.S. PATENT DOCUMENTS

| | | | | |
|---|---|---|---|---|
| 2,050,544 A | * | 8/1936 | Robinson et al. | 138/44 |
| 2,448,071 A | * | 8/1948 | Anderson | 138/44 |
| 2,896,668 A | | 5/1955 | Aitken | |
| 3,817,287 A | * | 6/1974 | Aitken | 138/94 |
| 3,891,146 A | * | 6/1975 | Blazek | 138/94.3 |
| 4,177,827 A | * | 12/1979 | Smith et al. | 137/318 |
| 4,394,826 A | | 7/1983 | Van Scoy | |
| 5,836,356 A | | 11/1998 | Desai | |
| 2005/0258388 A1 | | 11/2005 | Loga | |

OTHER PUBLICATIONS

PCT International Search Report dated Nov. 26, 2007 for counterpart application PCT/US2006/61647.
Written Opinion of the International Searching Authority dated Nov. 26, 2007 for counterpart application PCT/US2006/61647.

* cited by examiner

*Primary Examiner*—James F Hook
(74) *Attorney, Agent, or Firm*—Conley Rose, P.C.

(57) ABSTRACT

Apparatus and methods for operating a dual chamber orifice fitting. The dual chamber orifice fitting comprises a body having a lower chamber and a top having an upper chamber. An aperture connects the upper chamber to the lower chamber. A closure member is pivotally mounted to the fitting and pivots about a first axis between a first position and a second position. A pivot arm is rotatably mounted to the body and engages the closure member so that rotation of the pivot arm about a second axis pivots said closure member about the first axis between the first and second positions.

23 Claims, 8 Drawing Sheets

DUAL CHAMBER ORIFICE FITTING ISOLATION VALVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to methods and apparatus for monitoring characteristics of a flow stream in a pipeline, in particular to dual chamber orifice fittings. More precisely, the embodiments of the invention relate to an improved valve design for a dual chamber orifice fitting.

In pipeline operations and other industrial applications, flow meters are used to measure the volumetric flow rate of a gaseous or liquid flow stream moving through a piping section. Flow meters are available in many different forms. One type of flow meter is an orifice meter, which includes an orifice fitting connected to the piping section. The orifice fitting serves to orient and support an orifice plate that extends across the piping section perpendicular to the direction of flow stream. The orifice plate is a thin plate that includes a circular opening, or orifice, that is positioned within the flow stream.

In operation, when the flow stream moving through the piping section reaches the orifice plate, the flow is forced through the orifice, thereby constricting the cross-sectional area of the flow. Due to the principles of continuity and conservation of energy, the velocity of the flow increases as the stream moves through the orifice. This velocity increase creates a pressure differential across the orifice plate. The measured differential pressure across the orifice plate can be used to calculate the volumetric flow rate of the flow stream moving through the piping section.

A dual chamber orifice fitting enables the orifice plate to be removed from the fitting without interrupting the flow stream moving through the piping section. In many designs, this is achieved by providing two chambers within the fitting wherein the orifice plate is in the flow stream in one chamber and out of the flow stream in the second chamber. An isolation valve is provided between the two chambers so as to prevent fluid communication between the two chambers but can be opened to allow the orifice plate to pass therethrough.

Valve designs that are more compact and require less movement for actuation potentially provide advantages both in reduced operating envelope requirements and in simplification of operation. Thus, the embodiments of the present invention are directed to valve apparatus for dual chamber orifice fittings that seek to overcome these and other limitations of the prior art.

SUMMARY OF THE PREFERRED EMBODIMENTS

Embodiments of the present invention include dual chamber orifice fittings and methods for constructing and operating dual chamber orifice fittings. A dual chamber orifice fitting comprises a body having a lower chamber and a top having an upper chamber. An aperture connects the upper chamber to the lower chamber. A closure member is pivotally mounted to the fitting and pivots about a first axis between a first position and a second position. A pivot arm is rotatably mounted to the body and engages the closure member so that rotation of the pivot arm about a second axis pivots the closure member about the first axis between the first and second positions.

In certain embodiments, an isolation valve assembly comprises an operational shaft that is rotatably coupled to a body and rotates about a first axis. A pivot arm is rotatably coupled to the operational shaft. A closure member coupled to the pivot arm and pivotally mounted to the body. Rotation of the operational shaft about the first axis pivots the closure member about a second axis.

Thus, the embodiments of present invention comprise a combination of features and advantages that enable substantial enhancement of the operation of dual chamber orifice fittings. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

Figure 1:
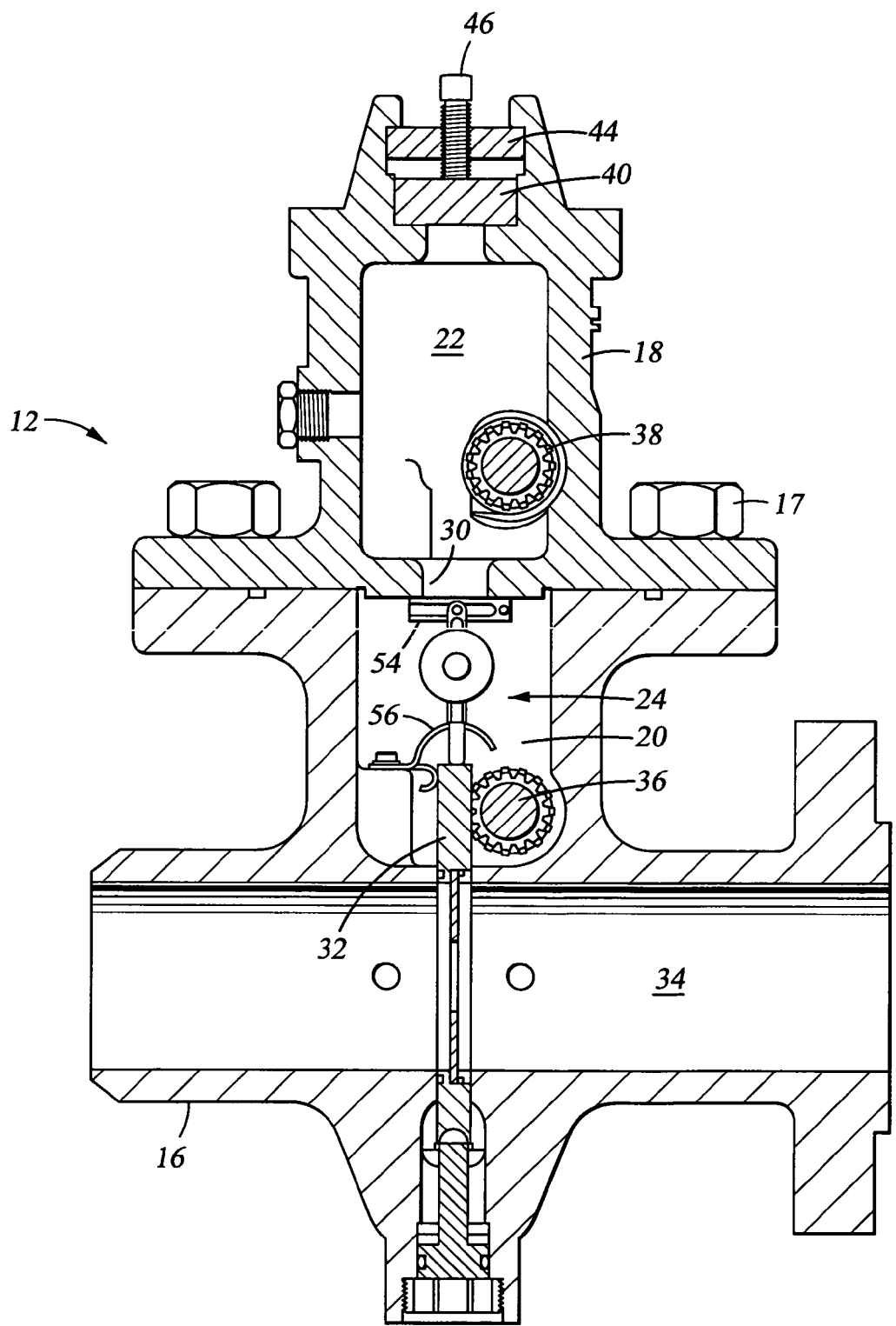
FIG. 1 is a partial cross-sectional view of a dual chamber orifice fitting having an isolation valve assembly shown in a closed position.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

Referring now to FIG. 1, dual chamber orifice fitting 12 includes body 16 and top 18. Body 16 encloses lower chamber 20 which is in fluid communication with the interior 34 of a pipeline. Top 18 encloses upper chamber 22 and is connected to body 16 by connection members 17. Aperture 30 defines an opening connecting upper chamber 22 to lower chamber 20. Isolation valve assembly 24 is mounted within body 16 and is actuatable so as to selectively close aperture 30. Lower drive 36 and upper drive 38 operate to move orifice plate carrier 32 vertically within fitting 12. Once in the upper chamber 22, orifice plate carrier 32 can be removed from fitting 12 by loosening clamping bar screws 46 and removing clamping bar 44 and sealing bar 40 from top 18.

Figure 2:
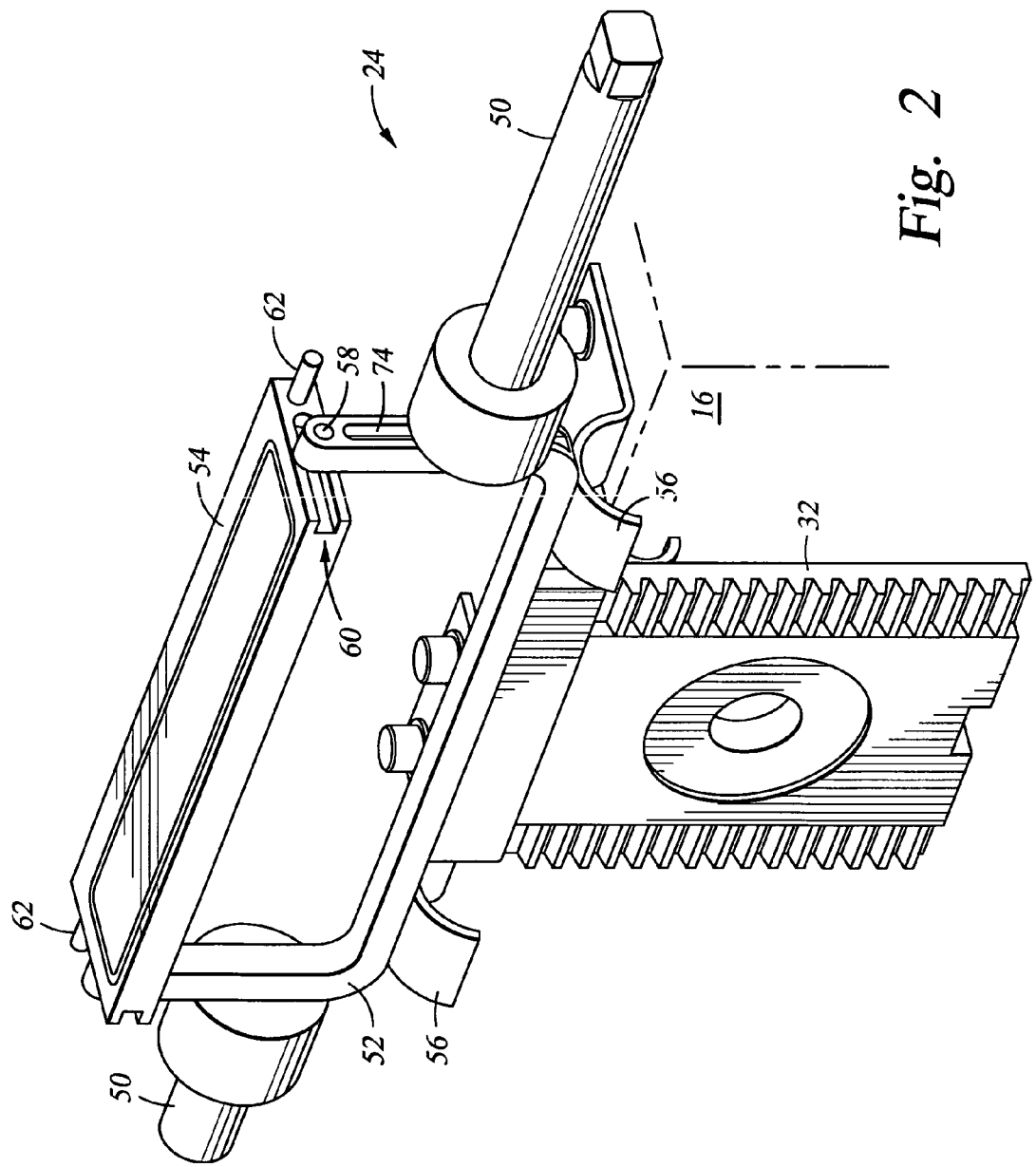
FIG. 2 is an isometric view of the isolation valve assembly of FIG. 1 shown in a closed position.

Isolation valve assembly 24 is shown in FIGS. 1 and 2 in the closed position. Isolation valve assembly comprises operational shafts 50, pivot arm 52, closure member 54, and preload biasing members 56. Operational shafts 50 rotatably couple to each side of pivot arm 52 so that the shafts and the pivot arm rotate together. Pivot arm 52 comprises pins 58 that slidably engage with slot 60 on closure member 54 and position the closure member in sealing engagement across aperture 30. Closure member 54 comprises hinge pins 62 that pivotally mount the closure member to either body 16 or top 18 (not shown). Hinge pins 62 support closure member 54 in the open position and when rotating. Hinge pins 62 are loosely contained in body 16 so as to allow movement of closure member 54 and ensure proper sealing engagement of closure member across aperture 30.

FIGS. 1 and 2 show orifice plate carrier 32 in a metering position in alignment with bore 34. Isolation valve assembly 24 is in a closed position, so that closure member 54 is sealingly engaged across aperture 30. Biasing members 56 are also mounted within body 16 and urge pivot arm 52 into closure member 54 when valve assembly 24 is in the closed position. Biasing members 56 provide sufficient force to effectuate a low pressure seal of closure member 54 across aperture 30. As pressure increases in lower chamber 20, pressure differential across closure member 54 will maintain the position of the closure member and the compression of the seal across aperture 30.

Figure 3:
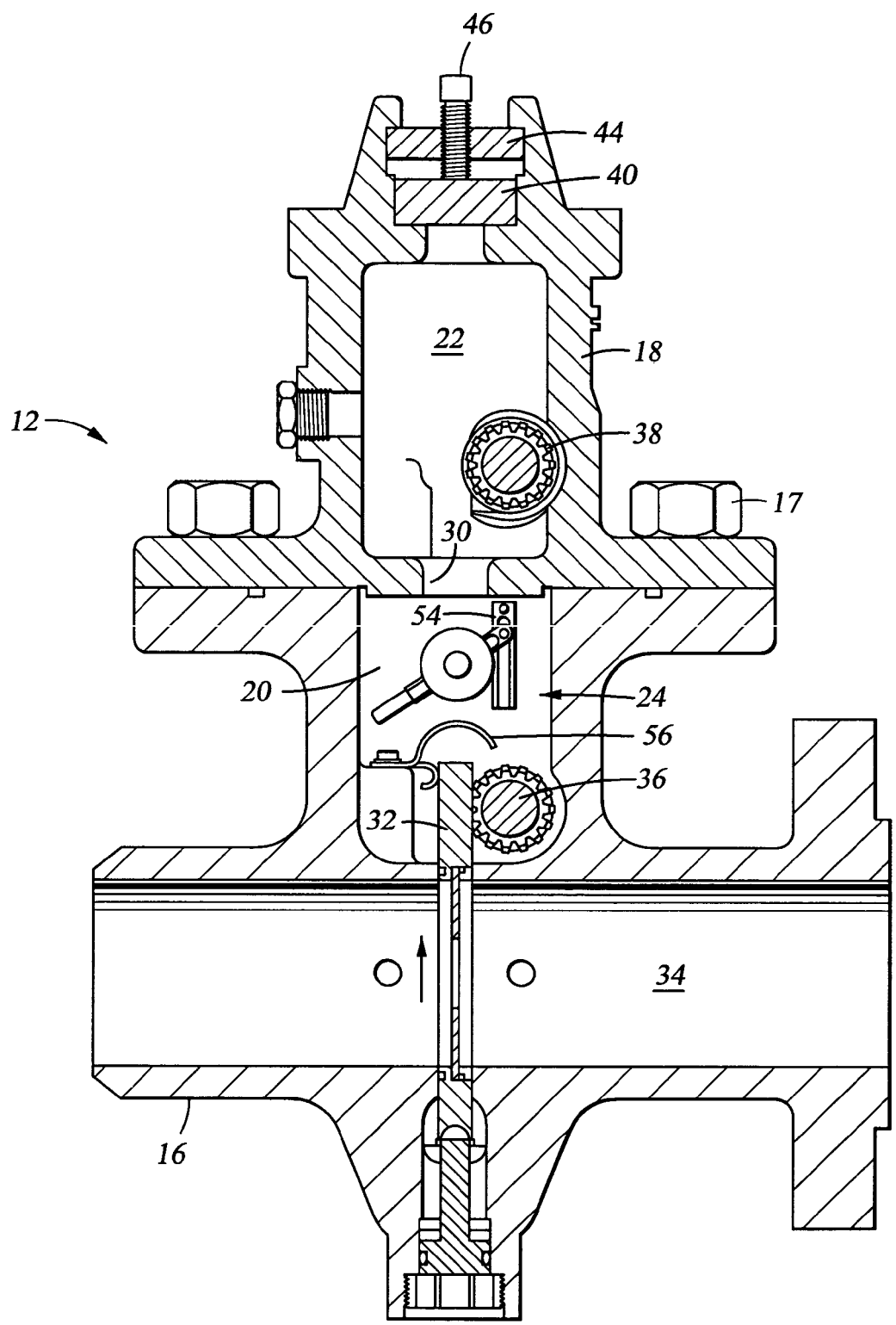
FIG. 3 is a partial cross-sectional view of the dual chamber orifice fitting of FIG. 1 showing the isolation valve assembly in an open position.

In order to remove orifice plate carrier 32 from fitting, isolation valve assembly 24 must be opened so that the plate carrier can be moved into upper chamber 22 through aperture 30. As shown in FIG. 3, once isolation valve assembly 24 is opened, lower drive 36 is actuated to move orifice plate carrier 32 upwards through aperture 30 into upper chamber 22. Once orifice plate carrier 32 is entirely within upper chamber 22, isolation valve assembly 24 is closed to isolate the upper chamber from bore 34 and lower chamber 20. Any pressure within upper chamber 20 can then be relieved and orifice plate carrier 32 can be removed from fitting 12 by loosening clamping bar screws 46 and removing clamping bar 44 and sealing bar 40 from top 18.

Figure 4:
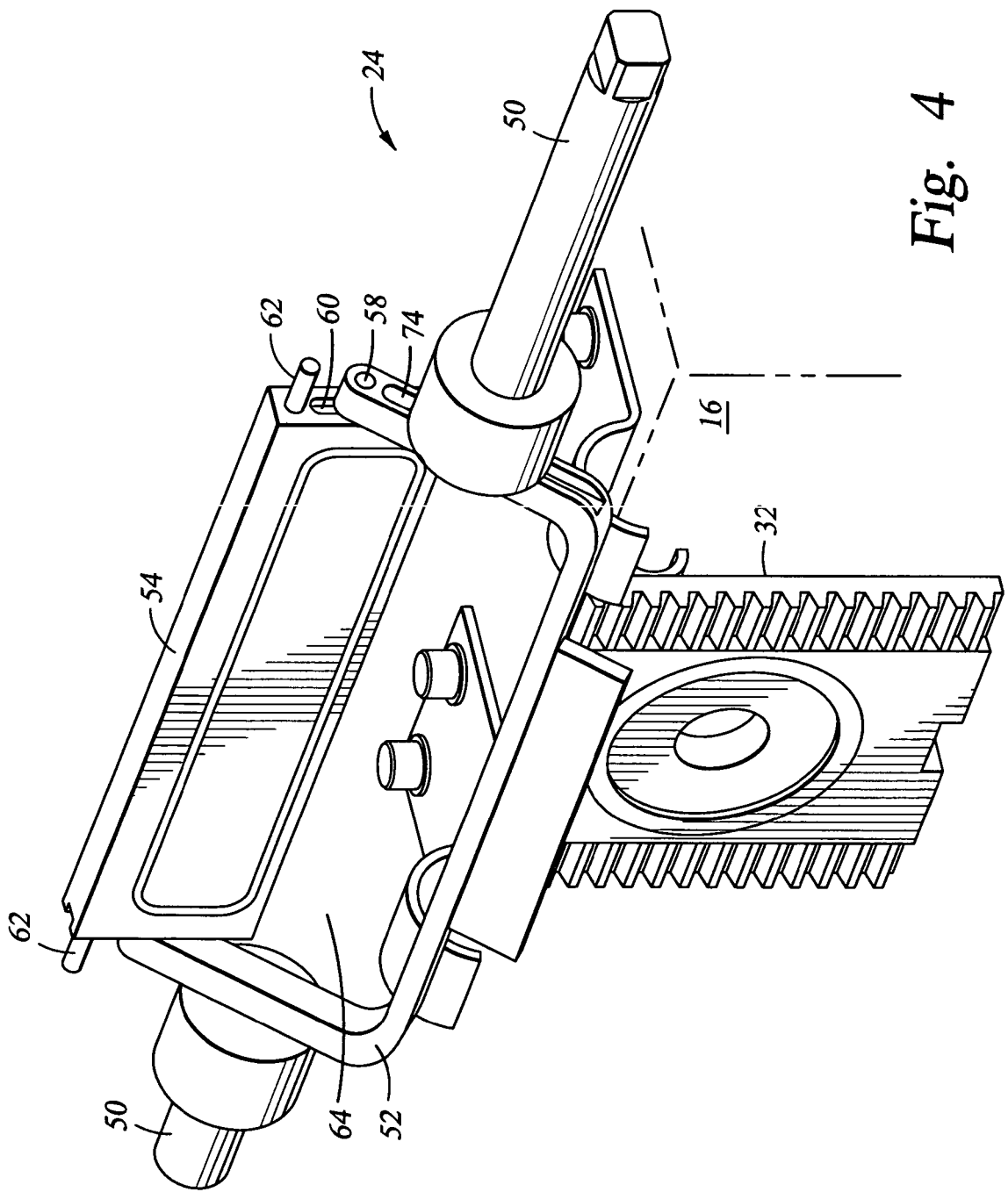
FIG. 4 is a partial isometric view of the isolation valve assembly of FIG. 1 in an open position.

Referring now to FIG. 4, isolation valve assembly 24 is shown in the open position. Operational shafts 50 and pivot arm 52 have been rotated approximately 45° from the closed position as shown in FIG. 3. As pivot arm 52 is rotated, pins 58 move through slot 60. The movement of pins 58 causes closure member 54 to rotate about hinge pins 62. Pivot arm 52 also disengages orifice plate carrier 32 and provides a clear area 64 through which the orifice plate carrier can travel. Pivot arm 52 and closure member 54 are arranged such that the pivot arm rotates about an axis that is offset from the axis about which the closure member rotates. The offset axes allow for a mechanical advantage to be generated by the arrangement of pivot arm 52 and closure member 54 that results in approximately 45° of rotation in the pivot arm generating the full 90° rotation of the closure member.

Figure 5:
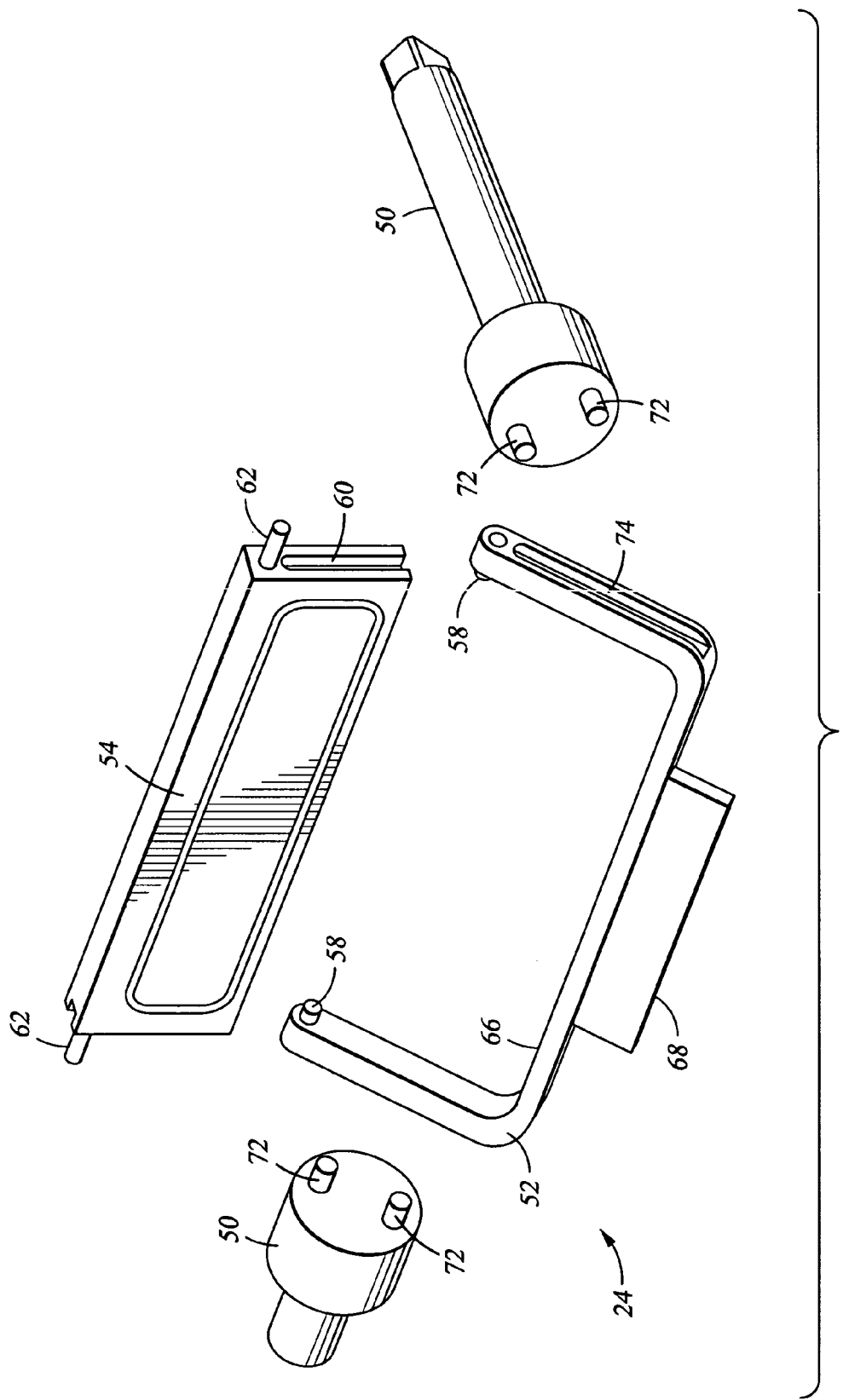
FIG. 5 is partial isometric view of one embodiment of an isolation valve assembly.
Figure 6:
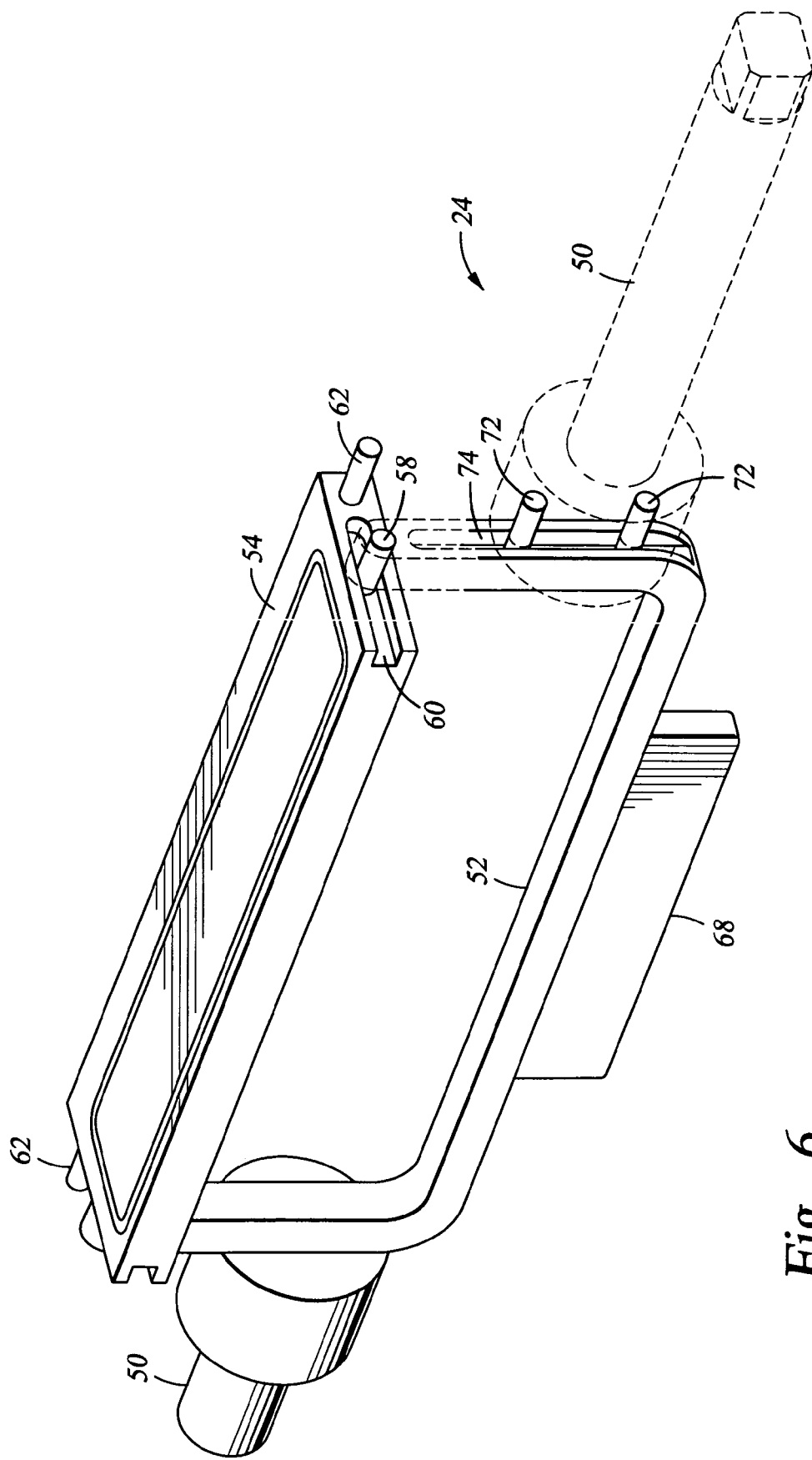
FIG. 6 is partial view of select components of an isolation valve assembly.

The components of isolation valve 24 are further illustrated in FIGS. 5 and 6. Pivot arm 52 comprises U-shaped member 66 having pins 58 mounted to each end and orifice plate carrier locator 68 extending from its center section. As shown in FIGS. 1 and 2, when isolation valve assembly 24 is in the closed position, locator 68 bears against orifice plate carrier 32 to ensure that the orifice is centered within pipeline 34. Pivot arm 52 is coupled to operational shafts 50 via the engagement of sliding members 72 and slot 74. Sliding members 72 may be a pair of pins, a key, or some other member that rotationally fixes pivot arm 52 to operational shaft 50 while allowing translation along slot 74. In certain embodiments, sliding members may be located on the pivot arm and the slot disposed on the operational shaft. Slot 74 and sliding members 72 provide ease of assembly of the components and allows pivot arm 52 to move relative to operation shafts 50 as biasing members 56 (see FIG. 2) urge pivot arm 52 into closure member 54 when valve assembly 24 is in the closed position.

Isolation valve assembly 24 also provides simple assembly of its components. Operational shafts 50 are first installed into body 16 so that sliding members 72 are aligned. Sliding members 72 are then inserted into slot 74 as pivot arm 52 is installed into body 16. Next, pins 58 on pivot arm 52 are inserted into slot 60 on closure member 54 and hinge pins 62 are disposed within receptacles on body 16 or top 18 as closure member 54 is installed. Once the assembly of isolation valve assembly 24 is complete, top 18 can be installed onto body 16.

Figure 7:
FIG. 7 is an end view of one embodiment of a closure member used with an isolation valve assembly.

In certain embodiments, closure member 54 may be constructed so that slots 60 have different widths. As shown in FIG. 7, closure member 54 comprises wide slot 76 and narrow slot 78, each located an equal distance 80 from the sealing surface 82 of closure member 54. Each slot engages with pins 58 having equal diameters. As can be seen in FIG. 5, pins 58 are each connected to pivot arm 52. As pins 58 move perpendicularly to the longitudinal axis of the slots, the pin 58 in narrow slot 78 will engage the side of the narrow slot before the other pin engages the side of wide slot 76. Thus, when closure member 54 is being opened, the opening force applied by the rotation of pivot arm 52 will initially be applied only to the side of the closure member with narrow slot 78. By applying the opening force to only one side of the closure member, the seal between the closure member and the top will tend to peel away gradually, which takes less force than trying to break the entire seal at one time.

Figure 8:
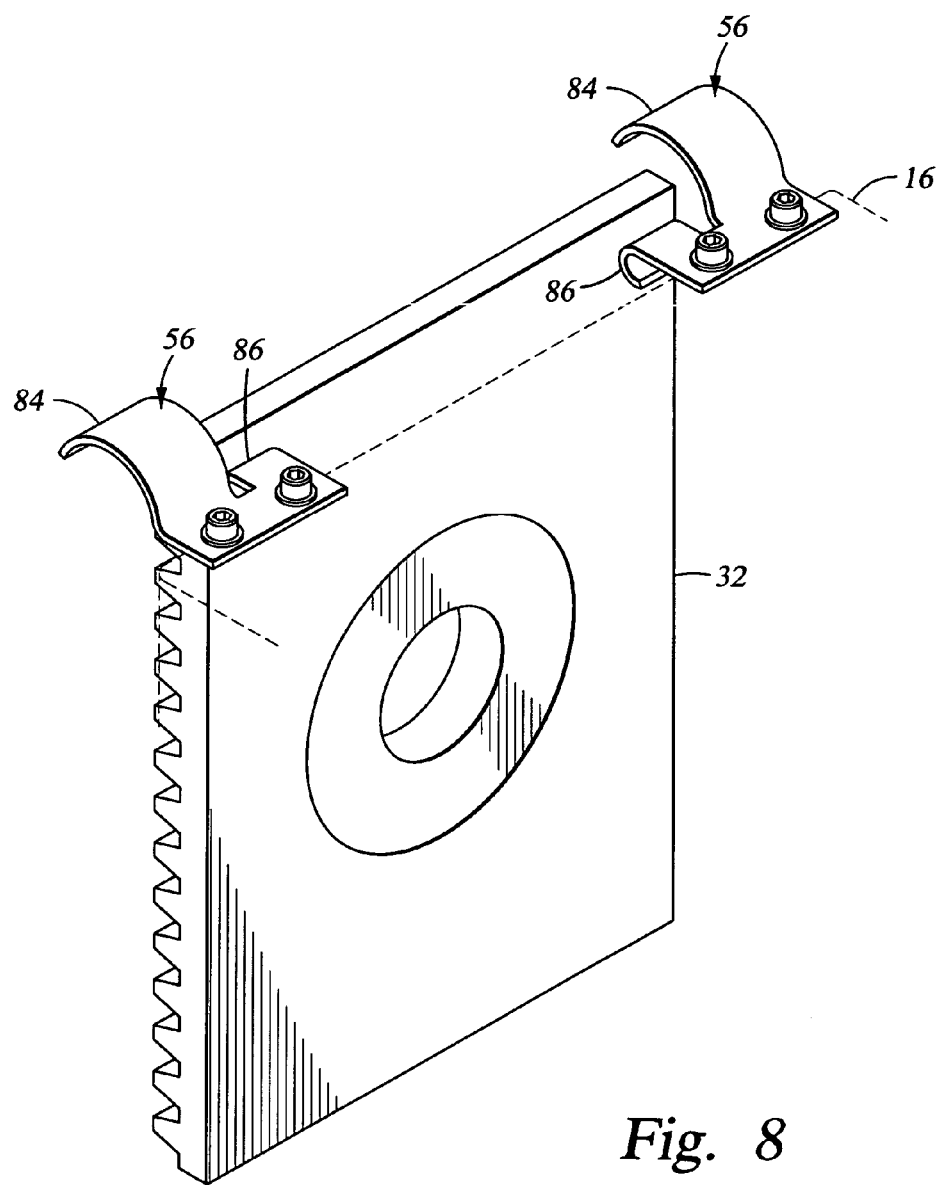
FIG. 8 is one embodiment of a biasing member used with an isolation valve assembly.

Referring now to FIG. 8, biasing member 56, in addition to biasing the closure member into sealing engagement as previously discussed, may be used to align orifice plate carrier 32. Biasing member 56 comprises leaf spring 84 and alignment tab 86. When orifice plate carrier 32 is in the metering position, as shown in FIG. 1, each side of the plate carrier contacts with an alignment tab 86 of a biasing member 56. The engagement of biasing members 56 helps insure that the rack of orifice plate carrier 32 is engaged with lower drive 36.

Figure 9:
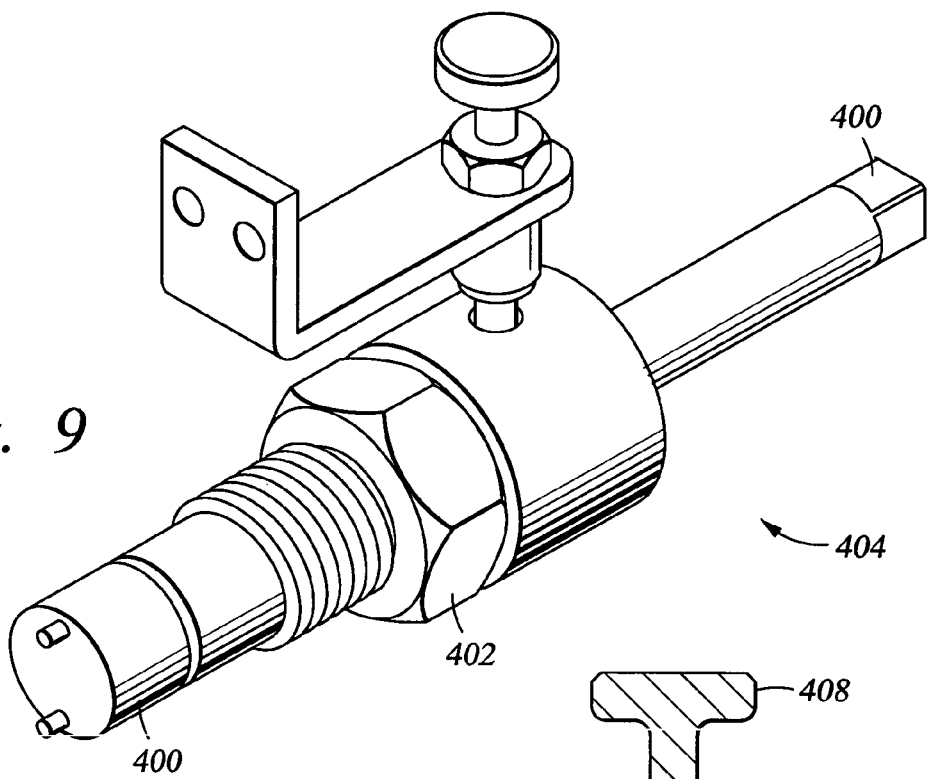
FIG. 9 is a partial isometric view of one embodiment of a shaft and bonnet assembly.
Figure 10:
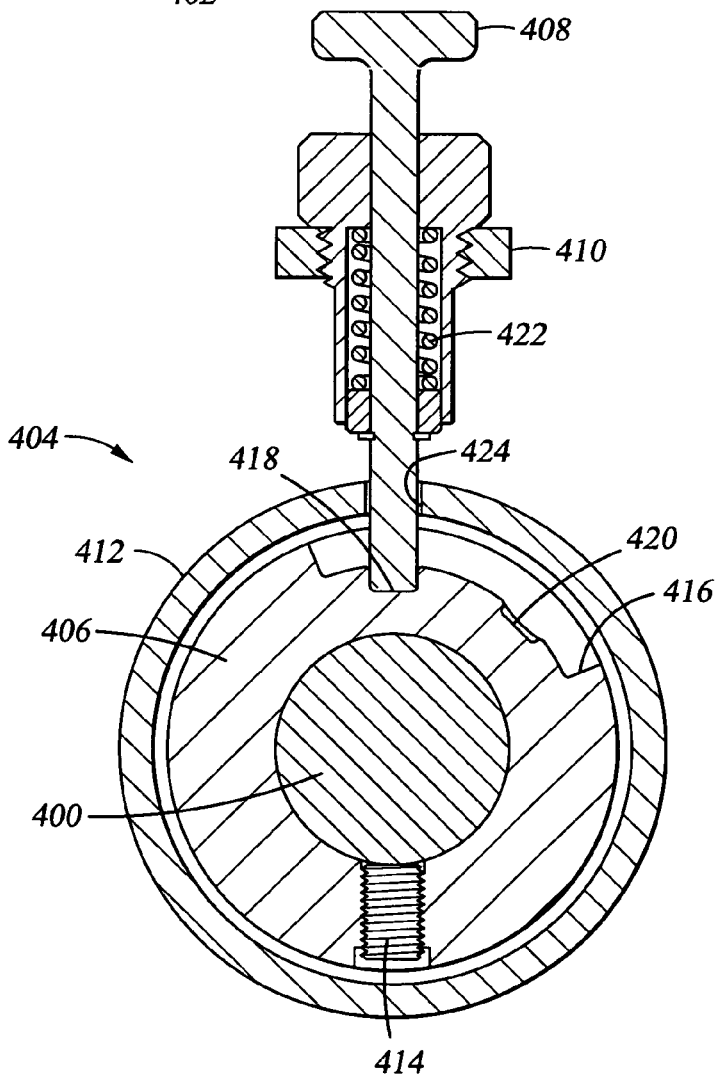
FIG. 10 is a cross-sectional view of the shaft and bonnet assembly of FIG. 9.

Referring now to FIGS. 9 and 10, operational shafts 400 may be connected to a fitting by bonnets 402 and interlock device 404, which limits the rotation of the shaft. Interlock device 404 comprises boss 406, release pin 408, pin bracket 410, and cover 412. Boss 406 is rotationally fixed to shaft 400, such as by set screw 414. Boss 406 comprises angular slot 416 having first and second pin retention locations 418 and 420. Pin bracket 410 is connected to the fitting body (not shown) so as to be stationary relative to shaft 400. Release pin 408 is mounted to pin bracket 410 and comprises biasing member 422 that urges the pin into engagement with slot 416. Cover 412 surrounds boss 406 and comprises hole 424 through which pin 408 projects. Cover 412 is stationary relative to boss 406.

Interlock device 404 serves to provide a lock that prevents the unintentional rotation of shaft 400 and limit the rotation of the shaft when moving the valve between its opened and closed positions. FIG. 10 illustrates interlock device 404 when the valve is in the closed position. Pin 408 is engaged with first retention location 418. The engagement of pin 408 and first retention location 418 prevents the rotation of shaft 400. Pin 408 must be disengaged from first retention location 418 before shaft 400 can be rotated. When shaft 400 is rotated, pin 408 remains engaged with slot 416. This engagement limits the rotation of shaft 400 and prevents rotating the valve past the opened position.

Once in the opened position, pin 408 will engage second retention location 420, giving an indication that the valve is now fully opened. Second retention location 420 may be arranged such that the engagement of pin 408 in the second retention location will not prevent shaft 400 from being rotated back towards the closed position. This allows the valve to be closed quickly without having to manipulate pin 408. In effect, the engagement between pin 408 and slot 416 prevents unintentional movement of the isolation valve assembly from the closed position to the opened position while not impeding rotation of the valve from the opened position to the closed position.

The isolation valve arrangements described herein are capable of operating in a compact space that allows for smaller, lighter weight, and more compact dual chamber orifice fitting assemblies. The isolation valve arrangement also provides a valve that is fully actuated with approximately 45 degrees of rotation. This provides significant advantages over a sliding valve that may need several full 360 degree rotations of a drive shaft to fully actuate. Not only does the isolation valve assembly operate quicker by requiring less rotation, but the limited rotation simplifies the automation of the actuation of the valve.

The preferred embodiments of the present invention relate to apparatus for hydraulically isolating the two interior chambers of a dual chamber orifice fitting. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. In particular, various embodiments of the present invention provide a number of different valve shapes and styles to improve operation of the fitting. Reference is made to the application of the concepts of the present invention to dual chamber orifice fitting with a plate orifice, but the use of the concepts of the present invention is not limited to these applications, and can be used for any other applications including other dual chamber fittings and orifice fittings. It is to be fully recognized that the different teachings of the embodiments discussed below may be employed separately or in any suitable combination to produce desired results.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A dual chamber orifice flow meter fitting comprising:
   a body having a lower chamber disposed therein;
   a top having an upper chamber disposed therein;
   an aperture connecting the upper chamber to the lower chamber;
   a closure member pivotally mounted within the fitting, wherein said closure member pivots about a first axis between a first position and a second position; and
   a pivot arm rotatably mounted to said body and engaged with said closure member such that rotation of said pivot arm about a second axis pivots said closure member about the first axis between the first and second positions.

2. The dual chamber orifice fitting of claim 1 further comprising a rotatable operational shaft coupled to said pivot arm and extending through a side of said body.

3. The dual chamber orifice fitting of claim 2 wherein a sliding member disposed on said operational shaft is engaged with a slot disposed on said pivot arm.

4. The dual chamber orifice fitting of claim 1 further comprising a biasing member disposed within said body and operable to urge said closure member into sealing engagement with said top when said closure member is in the second position.

5. The dual chamber orifice fitting of claim 1 further comprising:
   an orifice plate carrier disposed within a flow conduit through said body;
   a first alignment feature that controls the location of said orifice plate carrier relative to the flow conduit in a first direction; and
   a second alignment feature that controls the location of said orifice plate carrier relative to the flow conduit in a second direction.

6. The dual chamber orifice fitting of claim 5 wherein the first alignment feature is disposed on a biasing member that is disposed within said body and operable to urge said closure member into sealing engagement across said aperture when said closure member is in the second position.

7. The dual chamber orifice fitting of claim 5 wherein the second alignment feature is disposed on said pivot arm.

8. The dual chamber orifice fitting of claim 1 wherein said pivot arm further comprises:
   a center portion;
   a first end extending from said center portion and having a first pin connected thereto; and
   a second end extending said center portion and having a second pin connected thereto.

9. The dual chamber orifice fitting of claim 8 wherein the first pin is disposed within a first slot on said closure member and the second pin in disposed within a second slot on said closure member.

10. The dual chamber orifice fitting of claim 9 wherein, as said pivot arm pivots about the second axis, the first pin engages the first slot so as to pivot said closure member about the first axis between the first and second positions.

11. The dual chamber orifice fitting of claim 10 wherein, as said pivot arm pivots about the second axis, the first pin engages the first slot before the second pin engages the second slot.

12. An isolation valve assembly comprising:
   an operational shaft rotatably coupled to a flow meter fitting, wherein said operational shaft rotates about a first axis;
   a pivot arm rotatably coupled to said operational shaft; and
   a closure member coupled to said pivot arm and pivotally mounted to the flow meter fitting;
   wherein rotation of said operational shaft about the first axis rotates the pivot arm, and wherein rotation of the pivot arm pivots said closure member about a second axis spaced apart from the first axis.

13. The isolation valve assembly of claim 12 further comprising:
a slot disposed on said pivot arm; and
a sliding member disposed on said operational shaft and engaged with said slot.

14. The isolation valve assembly of claim 12 further comprising:
a first slot disposed on a first side of said closure member;
a second slot disposed on an opposite side of said closure member;
a first pin disposed on a first end of said pivot arm; and
a second pin disposed on a second end of said pivot arm.

15. The isolation valve assembly of claim 14 wherein the first pin is disposed within the first slot the second pin in disposed within the second slot such that as said pivot arm pivots about the first axis, the first pin engages the first slot so as to pivot said closure member about the second axis.

16. The isolation valve assembly of claim 15 wherein, as said pivot arm pivots about the first axis, the first pin engages the first slot before the second pin engages the second slot.

17. The isolation valve assembly of claim 12 further comprising a biasing member disposed within said flow meter fitting and operable to move said pivot arm relative to said operational shaft in a direction perpendicular to the first axis when said closure member is in a closed position.

18. The isolation valve assembly of claim 12 further comprising:
a first alignment feature that controls the location of an orifice plate carrier within the flow meter fitting along a first direction; and
a second alignment feature that controls the location of the orifice plate carrier in a second direction.

19. The isolation valve assembly of claim 18 wherein the first alignment feature is disposed on a biasing member that is disposed within said body and operable to move said pivot arm relative to said operational shafts in a direction perpendicular to the first axis when said closure member is in a closed position.

20. The isolation valve assembly of claim 18 wherein the second alignment feature is disposed on said pivot arm.

21. A method comprising:
installing a rotatable operational shaft into a body of a dual chamber orifice flow meter fitting;
installing a pivot arm into the body and rotatably coupled to the operational shaft, wherein the pivot arm is rotatable about a first axis; and
installing a closure member into the body and coupled to the pivot arm, wherein the closure member is pivotable about a second axis between a first position and a second position in response to rotation of the pivot arm.

22. The method of claim 21 further comprising connecting a top to the dual chamber orifice fitting, wherein the top comprises an aperture that provides communication between an upper chamber disposed within the top and a lower chamber disposed within the body, wherein communication through the aperture is prevented when the closure member is in the first position and communication through the aperture is allowed when the closure member is in the second position.

23. The method of claim 22 further comprising:
rotating the operational shaft so that the pivot arm rotates about the first axis and the closure member rotates about the second axis and moves from the first position to the second position;
moving an orifice plate carrier through the aperture; and
rotating the operational shaft so that the pivot arm rotates about the first axis and the closure member rotates about the second axis and moves from the second position to the first position.

* * * * *